United States Patent [19]
Ernst et al.

[11] 3,977,273
[45] Aug. 31, 1976

[54] FLYWHEEL

[75] Inventors: Adolphe O. G. Ernst, Lege; Pierre J. E. Lamicq, Bruges; Jean A. Peisino, Blanquefort, all of France

[73] Assignee: Societe Europeene de Propulsion, Puteaux, France

[22] Filed: Sept. 5, 1974

[21] Appl. No.: 503,416

[30] Foreign Application Priority Data
Sept. 4, 1973  France .................... 73.32544

[52] U.S. Cl. .................... 74/572; 156/169; 156/172
[51] Int. Cl.² .................... F16C 15/00
[58] Field of Search ............ 74/572; 156/169, 172

[56] References Cited
UNITED STATES PATENTS 3,057,509  10/1962  Bernd .................... 156/169
3,449,182  6/1969  Wiltshire .................... 156/172 X

*Primary Examiner*—Samuel Scott
*Assistant Examiner*—F. D. Shoemaker
*Attorney, Agent, or Firm*—Eyre, Mann, Lucas & Just

[57] ABSTRACT

A flywheel for an inertial guidance system, comprising a rim reinforced by a sheet formed of one or more filaments wound around the rim and intersecting adjacent the axis of symmetry of the rim. The sheet of filaments may be reinforced by means of a binder and the flywheel may or may not include a hub at the axis of symmetry and having the filaments wound therearound.

11 Claims, 3 Drawing Figures

FLYWHEEL

The present invention relates to an inertia flywheel of small mass, and more precisely to a flywheel intended to be utilised in inertial guidance systems for example for piloting space craft wherein certain of the corrections are effected by means of reactions of said flywheel, especially by influencing the speed of rotation.

To this end it is necessary to concentrate the mass of the flywheel in a rim and consequently the speed of rotation is limited by the tensile strength of the chosen material and essentially by that of the radially outermost layers which have to withstand the greatest centrifugal force. It is possible to raise this limiting speed by a compound solution of surrounding the rim with a circumferential binding of high tensile fibres. A system of such sophistication requires a suspension exteriorly of the major diameter of the rim. The weight of the assembly of flywheel and suspension becomes prohibitive, without mentioning the problems of stability, centering, vibration etc. which are very difficult to master.

For these reasons it is preferable to suspend this ring at its rotational axis, by adding a disc on the circumference of which the rim is formed. A concentration of centripetal forces is then observed at the centre of the disc. In this region an addition of mass becomes necessary so as to spread the constraints, but then the functions of (a) withstanding the centrifugal forces by the peripheral binding and (b) the concentration of the mass at the rim to increase the radius of gyration are no longer so dramatically fulfilled.

The object of the present invention is to mitigate the above mentioned disadvantages and to provide an inertia flywheel which enables a large radius of gyration to be offered while retaining the characteristics of the axial suspension.

Accordingly the present invention provides an inertia flywheel comprising a rim disposed coaxially about an axis of symmetry and at least one sheet formed of at least one filament having a first part enveloping the rim in direct contact therewith and a second part intersecting adjacent said axis of symmetry of the rim.

According to a further characteristic of the invention the sheet of filaments is formed by a single thread which partly surrounds a hub disposed in the theoretical axis of the rim before being stretched tangentially to said hub, extending almost radially toward the rim, passing over the rim so as to be stretched almost radially and then being tangentially wound on said hub. In this manner securing of the thread to the hub is obtained in positive manner without the use of any special securing means.

By virtue of the low weight of the thread which preferably consists of a composite body of high tensile strength, such as carbon or boron, almost all the mass is concentrated at the rim of the flywheel thereby increasing the radius of gyration. Thus for a given mass the greatest possible inertia is made available.

The sheet of threads forms, at either side of the hub when viewed in diametral section, two curtains each of which has a thickness greater near the hub than near the rim and decreasing progressively toward the rim, this enabling the constraints which develop in the proximity of the hub to be spread and to define variable mechanical characteristics by varying the thickness of said curtains. Furthermore, the axial rigidity can be improved by selecting an appropriate spacing of the two curtains at the hub.

According to a further important characteristic the orientation of the thread runs between the hub and the rim is preferably tangential to the hub and then almost radial at the rim to enable variable mechanical characteristics to be defined as a function of the radius of the flywheel, and this by virtue of the fact that the angle of intersection of said thread runs is not everywhere the same.

Other objects and advantages of the present invention will become apparent from reading the following description, given by way of non-limiting example, of a preferred embodiment of the invention, and from the accompanying drawing, in which.

Figure 1:
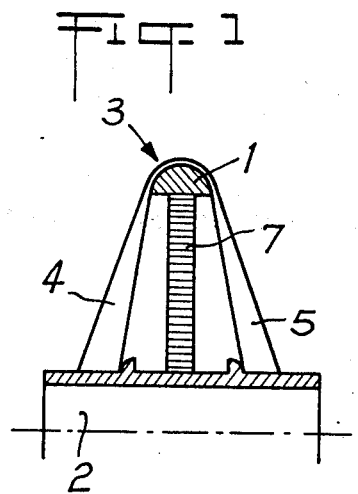
FIG. 1 is a diametral sectional view of an inertia flywheel according to one embodiment of the invention.
Figure 2:
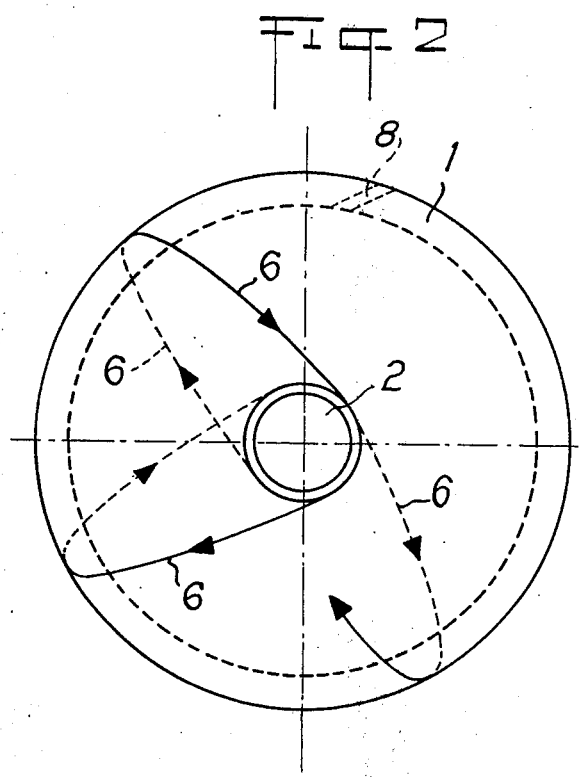
FIG. 2 is a plan view of the same inertia flywheel.
Figure 3:
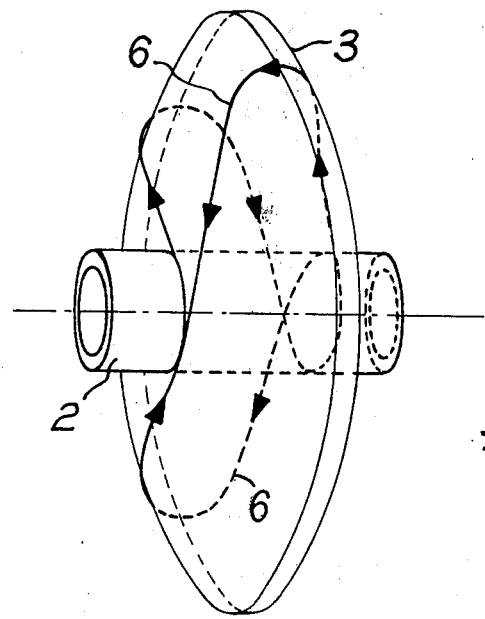
FIG. 3 is a view in perspective of the inertia flywheel of FIGS. 1 and 2.

The inertia flywheel shown in FIGS. 1 to 3 comprises a rim 1 in which the major part of its inertia mass is concentrated, a hub 2 disposed co-axially with the theoretical axis of said rim and to which can be secured the suspension means which may comprise bearing means such as mechanical bearings, fluid bearings, or electromagnetic suspension means. Between the hub 2 and the rim 1 and at either side of the rim 1 (see FIG. 1) there is disposed a sheet consisting of one or more layers of filaments 3 which form two curtains 4 and 5 the spacing of which can be chosen according to the requirements for rigidity and for stability of the flywheel. Each curtain 4 or 5 is of greater thickness in the proximity of the hub 2 so as to accommodate a given number of filaments in the same sector, thus spreading the constraints at the level of the hub 2.

In order to obtain such a sheet one proceeds from a single thread 6 of suitable length and consisting for example of a body of compound high tensile fibre such as carbon or boron. A provisional liaison mass 7 forms the linking element between the hub 2 and the rim during the winding process. This provisional liaison mass is, of course, of a material which is capable of being removed, by any suitable means, when the winding has been finished. It may be made of plaster or of a soluble material. The single thread 6 partially surrounds the hub, is then stretched in a manner which proceeds tangentially from said hub and arrives on the rim 1 in an almost radial direction. Thereafter the rim is enveloped at a pitch which is a function of the characteristics of the desired flywheel, so as to be stretched almost radially toward the hub 2 on which it arrives tangentially at a point diametrally opposite the preceding tangential point before being again stretched toward the rim 1; winding is continued until the desired sheet which envelopes the rim has been obtained. This enables the circumferential tensions which develop in the threads in the vicinity of the rim to be almost completely eliminated, so as to bring them back to radial or virtually radial directions.

The sheet may be formed by winding the thread in different manners, and even by winding a tape of fabric instead of a single thread.

Thus, the runs of thread extending from the hub 2 toward the rim 1 may be disposed side by side without intersecting each other between the hub and the rim, the intersections being located at the level of the hub 2, or these runs of thread may intersect between the hub 2 and the rim 1.

If it is desired to reinforce a portion of the flywheel or to increase or redistribute the inertia mass on a portion of the rim 1, the thread may be wound several times all around this portion of the rim 1 after having been stretched from the hub 2 and before being stretched again toward the hub 2. Similarly, part or all of the thread segments may be chordal rather than radial, depending of the effect desired.

In all cases, the layers of thread are subsequently stiffened by a binder such as a resin.

Finally, it is possible to provide the rim 1 with a slit 8 (only shown on FIG. 2) so that the rim 1 may adapt itself through circumferential expansion to the elongations of the wound sheet due to the stresses created during rotation of the flywheel, this sheet supporting then alone all these stresses. It is clear that the rim may share in the exertions by consisting of a suitable selected material, or having the stresses in the rim reduced to obtain a better adaptation by creating, through the winding, a prestress in the said rim. This prestress is obtained through the tension of the threads and this tension can, of course, be varied as a function of the desired effect.

The above description has been given with reference to a flywheel comprising a hub and a rim. It will readily be understandable that a different kind of flywheel not comprising a hub could be obtained. For this purpose it suffices to form the winding as previously but using a removable hub such as one formed of plaster or soluble material which can be removed when the sheet has been both formed and rigidified for example by a suitable resin binder. The space around the theoretical axis of the rim, which will then have been left free by removal of the hub, is usefully employed for positioning the magnetic bearings or any other suspension means. Alternatively the said bearings can be sunk into the mass of the sheet at the time of winding. In this modified embodiment the runs of thread between the theoretical axis of the rim and the outer crown of the rim may be either parallel and intersecting only at the level of said theoretical axis, or they may intersect in the same manner as in the case of the flywheel containing a hub and a rim.

The threads 6 may be of mono-filament or multi-filament form and the sheet of threads may consist of several different overlapping threads or of a single thread wound round the rim and hub several times to form overlapping layers of thread.

The present invention is, of course, not limited to the embodiments which have been described and illustrated in FIGS. 1 to 3, but rather covers any variants embraced within the scope of the following statement of claim.

We claim:

1. An inertia flywheel comprising a rim having an axis of symmetry and a sheet formed of at least one filament, said sheet enveloping at least partially the outer surface of said rim in direct contact therewith and extending from said outer surface toward adjacent said axis on each side of said rim, the runs of filament forming each part of the sheet extending from said outer surface of the rim toward adjacent said axis being directed from adjacent said axis substantially radially toward said rim and intersecting adjacent said axis between said axis and said rim.

2. An inertia flywheel as set forth in claim 1 and including means for suspending and driving said flywheel arranged in an aperture formed in said sheet coaxially about said axis.

3. An inertia flywheel as set forth in claim 2 wherein said suspension and drive means comprises a hub around which at least one of the filaments forming said sheet is wound, the runs of filaments forming each part of the sheet extending from said outer surface of the rim toward adjacent said axis being directed substantially tangential to said hub.

4. An inertia flywheel as set forth in claim 3 wherein said sheet is formed by a single thread wound around the rim and the hub.

5. An inertia flywheel as set forth in claim 3 wherein each said part of the sheet extending from said outer surface of rim toward adjacent said axis has a greater thickness in its portion adjacent said hub and a decreasing thickness towards the rim.

6. An inertia flywheel as set forth in claim 3 wherein said parts of the sheet extending from said outer surface of the rim toward adjacent said axis on each side of the rim are divergent away from one another in a radial direction towards said hub.

7. An inertia flywheel as set forth in claim 1 wherein said sheet comprises a plurality of layers and a binder rigidifying said layers.

8. An inertia flywheel as set forth in claim 1 wherein said sheet is formed of at least a thread consisting of a body of compound high tensile fibres made of an element selected from the group consisting of carbon and boron.

9. An inertia flywheel as set forth in claim 1 wherein the rim is at reast subjected to a compressive prestress created by tension in the filament.

10. An inertia flywheel as set forth in claim 1 wherein said rim is provided with a slit.

11. An inertia flywheel as set forth in claim 3 wherein said filments are disposed adjacent to each other in the run from said axis, to and around said rim and in the return run to said axis.

* * * * *